June 2, 1964 R. M. HULTBERG 3,135,829

CONFERENCE CALL CIRCUIT

Filed Oct. 9, 1959

INVENTOR.
R. M. HULTBERG

BY [signature]

ATTORNEY

United States Patent Office 3,135,829
Patented June 2, 1964

3,135,829
CONFERENCE CALL CIRCUIT

Richard M. Hultberg, West Orange, N.J., assignor to International Telephone & Telegraph Corporation, New York, N.Y., a corporation of Maryland Filed Oct. 9, 1959, Ser. No. 845,448
7 Claims. (Cl. 179—1)

Figures 1, 2:
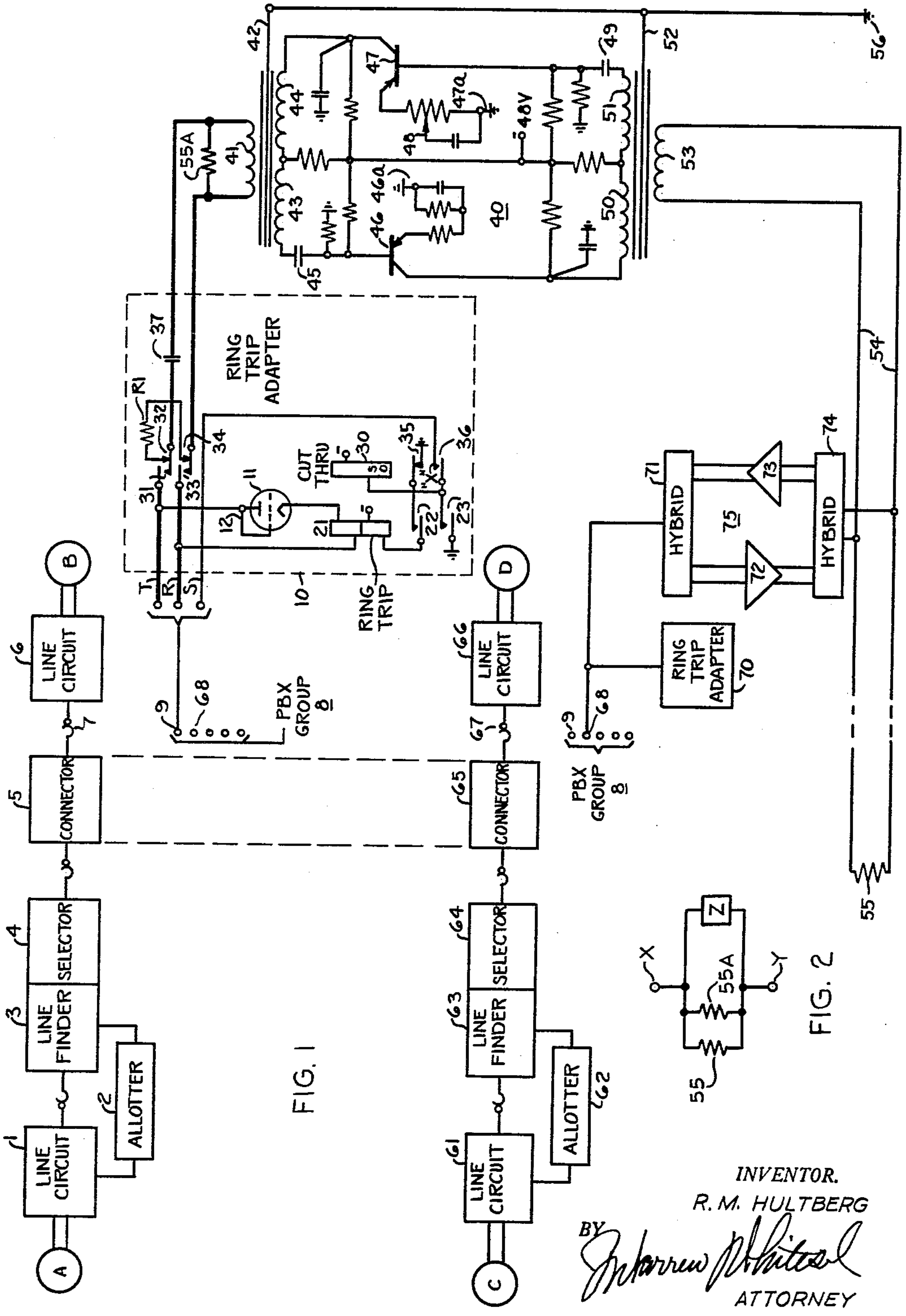

This invention relates to automatic telephone systems and more particularly to conference call circuits for use in such systems.

The circuit values of telephone systems are such that two subscribers may talk to each other and have satisfactory voice transmission. However, if a great number of subscriber stations are connected into a conference circuit, the subscribers can no longer hear each other due to the loss of signal caused by additional receivers being connected in parallel across the talking conductors. Therefore, means must be provided to compensate for additional telephone stations, as by amplifying voice signals, for example. Obviously, the amount of amplification that is introduced depends upon the number of the subscriber stations that are being served during any given conference call. Thus, the problem is to provide a control which automatically adjusts the amount of amplification in conformity with the number of subscriber stations that are included in a conference call circuit. While many conference call circuits have been proposed in the past, each introduces certain problems centered about such things as lack of uniformity of subscriber line impedance, signal feedback or singing, echo suppression, or the like.

An object of this invention is to provide a new and improved conference call circuit.

Still another object of this invention is to provide a self-compensating, simple and reliable conference call circuit having a long, trouble-free life.

In accordance with this invention, a plurality of simple, two-way voice current repeaters are provided in order that each line included in a conference call circuit may be connected to a repeater on a one-for-one basis, e.g. five subscriber lines are connected to five repeaters, ten subscriber lines to ten repeaters, etc. One side of each two-way repeater is connected to an individually associated subscriber line and the other side is connected to a common bus where the voice signals are mixed. Various resistances in the conference call circuit are connected in parallel with the subscriber lines to minimize the effects of variations in subscriber line impedances. The gain introduced by each repeater is adjusted to compensate for the losses which result from the insertion of one conference unit. In this manner, a variable number of subscriber lines may be interconnected in a single conference circuit without singing, echo, or excessive loss of signal strength.

For convenience of expression, the term "reflective coupling" is used hereinafter to describe this manner in which the repeaters are connected. That is, a number of two-way amplifiers including two sets of terminals have a first set of the terminals connected to the individual subscriber lines and the second set of the terminals connected to the common mixing circuit. Thus, signals applied from any line to any of the first sets of terminals are fed through the amplifiers to the mixing circuit where they are "reflected" back through all of the amplifiers to the first sets of terminals and, therefore, to all subscriber lines. In this manner, both the transmitter and the receiver of a subscriber line are effectively connected to the same set of amplifier terminals.

The above mentioned and other features and objects of this invention and the manner of obtaining them will become more apparent and the invention itself will be best understood, by reference to the following description of an embodiment of the invention taken in conjunction with:

FIG. 1 which shows a conference call circuit; and

FIG. 2 which explains a method of securing a degree of uniformity of subscriber line impedance.

Most of the components which are shown in the drawing will be fully understood by those skilled in the art in view of the material which is included in the following description. However, one feature which is not explained elsewhere relates to items 42 and 52 which comprise electro-static shielding that is situated between windings of the hybrid circuits. Although the device may take different forms, one example of a suitable shielding is provided by a grounded winding situated between winding 41 and windings 43—44, thus preventing electro-static coupling therebetween. A similar grounded winding 52 is situated between winding 53 and windings 50—51.

The drawing shows automatic step-by-step switches for interconnecting the conference call circuits; whereas, the conference call circuit may be used in connection with crossbar equipment, electronic switching equipment, manual switchboards, or the like. Therefore, it should be understood that the specific switching system that is shown in the drawing is given by way of example only.

Briefly, a first subscriber at station A calls a number of other subscribers in a conventional manner and asks each of them to meet him in a conference call at a particular time. At the appointed time each person, such as subscribers at stations A and C, dial the directory number of PBX trunk group 8; whereupon, connectors 5 and 65 seize idle sets of terminals from among PBX trunk group 8 and transmit ringing current in a conventional manner. Ringing current is tripped immediately by adapters 10 and 70. Thereafter, each call is extended to a common bus or mixing circuit 54 via two-way voice current repeaters 40 and 75. For example, voice currents originating at subscriber station C are transmitted to common bus 54 through hybrid circuit 71, transmit amplifier 72 and hybrid circuit 74. Amplifier 72 serves two primary functions: First, it balances a bridge circuit comprising amplifier 73 and hybrid circuits 71 and 74, and second, it isolates the transmit circuit from the receive circuit. The voice currents which are mixed on common bus 54 are reflectively coupled through other circuits similar to items 74, 73, and 71 to receivers at associated subscriber stations. Amplifier 73 provides a fixed signal current gain which is adequate to compensate for losses caused by one subscriber station.

If a plurality of subscribers are connected via a single circuit which has the impedance of one subscriber station, that single circuit is connected to one amplifier. For example, any number of subscribers may talk over a microwave system which terminates at a central office with the impedance of a single subscriber line. When the conference call is set-up, the microwave system is connected into the conference call circuit as if it were a single subscriber line.

In greater detail, ringing current is transmitted in any well known manner, as for example over the circuit extending from connector 5, conductor T, grid control connection 12 of gas tube 11, the upper winding of ring trip relay 21 (which operates) and conductor R to connector 5. The circuit including the upper winding of ring trip relay 21 provides a conductive path which is similar to the condition created when a called subscriber answers, thus causing connector 5 to trip ringing in any well known manner.

Responsive to the operation of relay 21, contacts 22 close to complete a holding circuit from ground at contacts 35 through contacts 22 and the lower winding of ring trip relay 21 to battery. Contacts 23 close thereby completing an obvious circuit to energize cut through relay 30 which has slow operate characteristics, thus allowing enough time to trip ringing.

After a brief period of time, as measured by its slow operate characteristics, relay 30 first closes its "X" or preliminary contacts 36 thereby locking to sleeve conductor S. Contacts 32 and 34 open thereby removing idle line termination R1 from hybrid winding 41 while contacts 31 and 33 close to connect the calling subscriber line thereto. Capacitor 37 electrically isolates hybrid winding 41 from the D.C. line potential.

Ringing current which is extended responsive to the initiation of calls by every other conferring subscriber is tripped in a similar manner, as at adapter 70, for example.

Next, to be described is the manner in which the voice currents are transmitted through the repeaters.

For example, voice currents originating at subscriber station A, are extended through the switch train to conductor T, contacts 31, capacitor 37, winding 41 and resistance 55A, contacts 33, conductor R and return to station A. Signals in winding 41 are induced by transformer action into winding 43, coupled across capacitor 45 and applied to the base of transistor 46 in accordance with variations of the voice signals. Transistor 46 responds to control the current which flows from ground 46A through transistor 46, and winding 50 to negative 48 volt battery. Although transistor 46 provides some amplification, its primary function is to isolate the transmit currents and to balance amplifier 47 in order that the hybrid circuit might function properly. Current flowing through winding 50 is induced by transformer action in winding 53 and applied to a common mixing circut in the form of bus 54.

Means is provided for minimizing the effects of impedance variation of the lines which are connected into the conference call circuit—the principle being shown by FIG. 2. That is, each two-way repeater includes an input resistance 55A and the common mixing circuit or bus 54 includes a terminating resistance 55—the total resistive effects of items 55 and 55A being connected in parallel with the total impedance Z of the subscriber line and all associated equipment. Without the effects of items 55 and 55A, the impedance between points X and Y may vary over a wide range depending primarily upon conditions on the line. However, with the addition of resistances 55 and 55A, the total fluctuation of impedance between points X and Y may be limited to values centered about the resistance of items 55 and 55A.

It should be noted that signals mixed on common bus 54 are reflectively coupled through the repeaters to telephonically interconnect the lines that participate in the conference call. That is, in order to complete the voice circuit from station A to station C, currents flowing on common bus 54 are transmitted through hybrid circuit 74 to receive amplifier 73, hybrid circuit 71, terminal 68 of PBX group 8, connector 65, selector 64, linefinder 63, and line circuit 61 to subscriber station C.

Means is provided to compensate for the loss characteristics associated with each subscriber line included in the conference call. To illustrate, voice currents originating at subscriber station C are transmitted through the switch train, terminal 68, hybrid network 71, amplifier 72 (which is identical to the amplifier including transistor 46), hybrid 74 and common bus 54. By transformer action, voice currents are induced from winding 53 to winding 51, capacitor 49 serving to isolate winding 51 from direct current. The voice signals are applied to the base electrode of transistor 47, thus controlling current which flows from ground 47A through transistor 47 and winding 44 to negative 48 volt batery. Potentiometer 48 is provided to give a fine adjustment of the amplification.

Signals amplified by transistor 47 are transmitted from winding 44 to winding 41 by transformer action. Thereafter, the voice currents are extended over the heavily inked conductors, connector 5, selector 4, linefinder 3 and line circuit 1 to subscriber station A.

When the principles of the invention have been described in connection with the specific apparatus, it is to be clearly understood that this description is made only by way of example and not as a limitation on the scope of the invention.

I claim:

1. A telephone conference call circuit comprising a plurality of lines, each having similar electrical loss characteristics, a plurality of voice current repeaters, each providing a signal gain that compensates for said loss characteristics, means for individually connecting each of said lines to a voice current repeater, and means comprising a common bus for reflectively coupling said lines through said voice current repeaters thereby telephonically interconnecting said lines.

2. The conference call circuit of claim 1 wherein each of said voice current repeaters comprises at least two sets of terminals, means for coupling said lines to individually associated ones of a first of said sets of terminals, means for coupling said common bus to all of the other of said sets of terminals, and means for limiting the effects of impedance variation of said lines coupled to all of the other of said sets of terminals.

3. The conference call circuit of claim 2 wherein said means for limiting the effect of impedance variations comprises at least one impedance connected across said common bus and in parallel with said lines for dividing current flowing in said lines whereby the total effective impedance of said lines is the sum of the impedance of said lines and of said one impedance.

4. In a telephone system, a plurality of two wire lines for transmitting voice signals, each of said lines having electrical characteristics which effect said voice signals, a plurality of means each of which compensates for said characteristics, each of said means comprising a two-way circuit having first and second sets of terminals, means for coupling each of said lines to an individual one of the first of said sets of terminals, means including a common mixing circuit coupled to all of the second of said sets of terminals for interconnecting said compensating means thereby reflectively coupling said lines, and means for limiting the effects of impedance variation of said lines.

5. The telephone system of claim 4 wherein each of said compensating means comprises a bridge including two amplifiers and two hybrid circuits.

6. A telephone conference call circuit comprising a plurality of lines, each of said lines having similar electrical loss characteristics, a plurality of two-way voice current repeaters, each of said voice current repeaters having at least two sets of terminals with means for amplifying signals appearing at either of said sets of terminals and applying the amplified signal to the other of said sets of terminals, the total gain of said repeater compensating for the loss characteristics of one of said lines, means for individually coupling each of said lines to a first of said sets of terminals of individually associated ones of said voice current repeaters, means comprising a common mixing circuit coupled to the other of said sets of terminals of all of said voice current repeaters for reflectively coupling said lines through said voice current repeaters and thereby telephonically interconnecting said lines, and means including a fixed impedance connected across each of said sets of terminals for fixing the effective impedance of said lines at said repeaters.

7. In a telephone system, a plurality of lines for transmitting voice signals, each of said lines having electrical characteristics which effect said voice signals, a plurality of two-way circuits for compensating for said characteristics, each of said two-way circuits having first and second sets of terminals and comprising bridge means including two amplifiers and two hybrid circuits, means for coupling each of said lines to an individual one of the first of said sets of terminals, means including a common mixing circuit coupled to all of the second said sets of terminals for interconnecting said two-way circuits thereby reflectively coupling said lines, and limiting means comprising at least one resistor connected in parallel with said lines to divide the current flowing in said lines, the value of said resistor being chosen virtually to fix the total impedance of said parallel connection despite minor variations in the impedance of any of said lines.

References Cited in the file of this patent

UNITED STATES PATENTS

| | | |
|---|---|---|
| 1,944,283 | Strecker | Jan. 23, 1934 |
| 2,035,536 | Cowan et al. | Mar. 31, 1936 |
| 2,449,344 | Tschumi | Sept. 14, 1948 |
| 2,543,986 | Prahm | Mar. 6, 1951 |
| 2,755,445 | Rhodes | July 17, 1956 |
| 2,871,291 | Horner | Jan. 27, 1959 |
| 2,912,503 | Grandstaff et al. | Nov. 10, 1959 |